Dec. 29, 1964  W. A. BERTOLINI  3,163,442
BOGIE SPRING EQUALIZING CONSTRUCTION
Original Filed Dec. 5, 1960  5 Sheets-Sheet 1
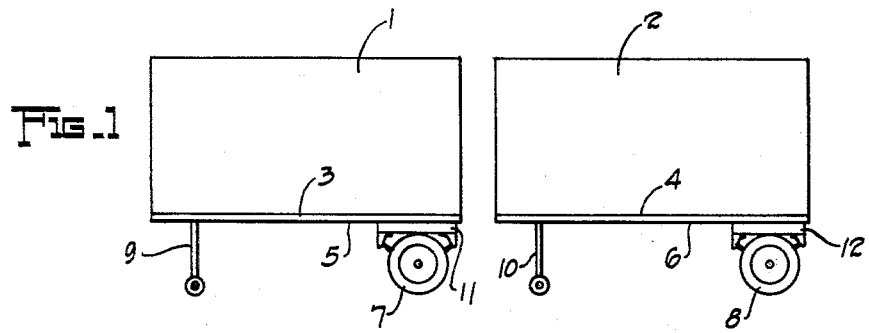
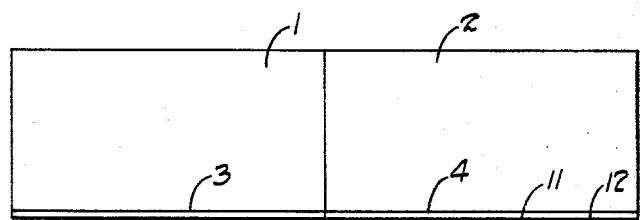
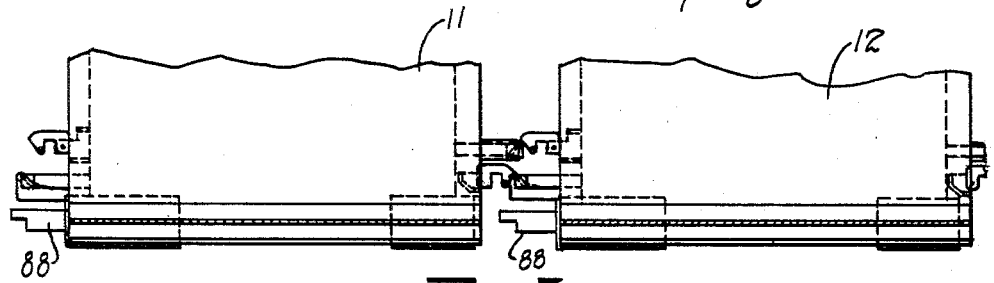
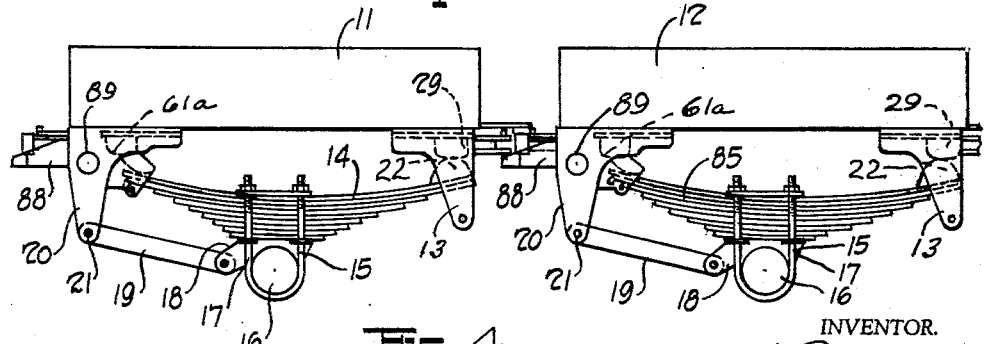
INVENTOR.
W. A. BERTOLINI
BY INVENTOR.
W. A. BERTOLINI
BY
Robb & Robb
Attorneys Dec. 29, 1964 W. A. BERTOLINI 3,163,442
BOGIE SPRING EQUALIZING CONSTRUCTION
Original Filed Dec. 5, 1960 5 Sheets-Sheet 3
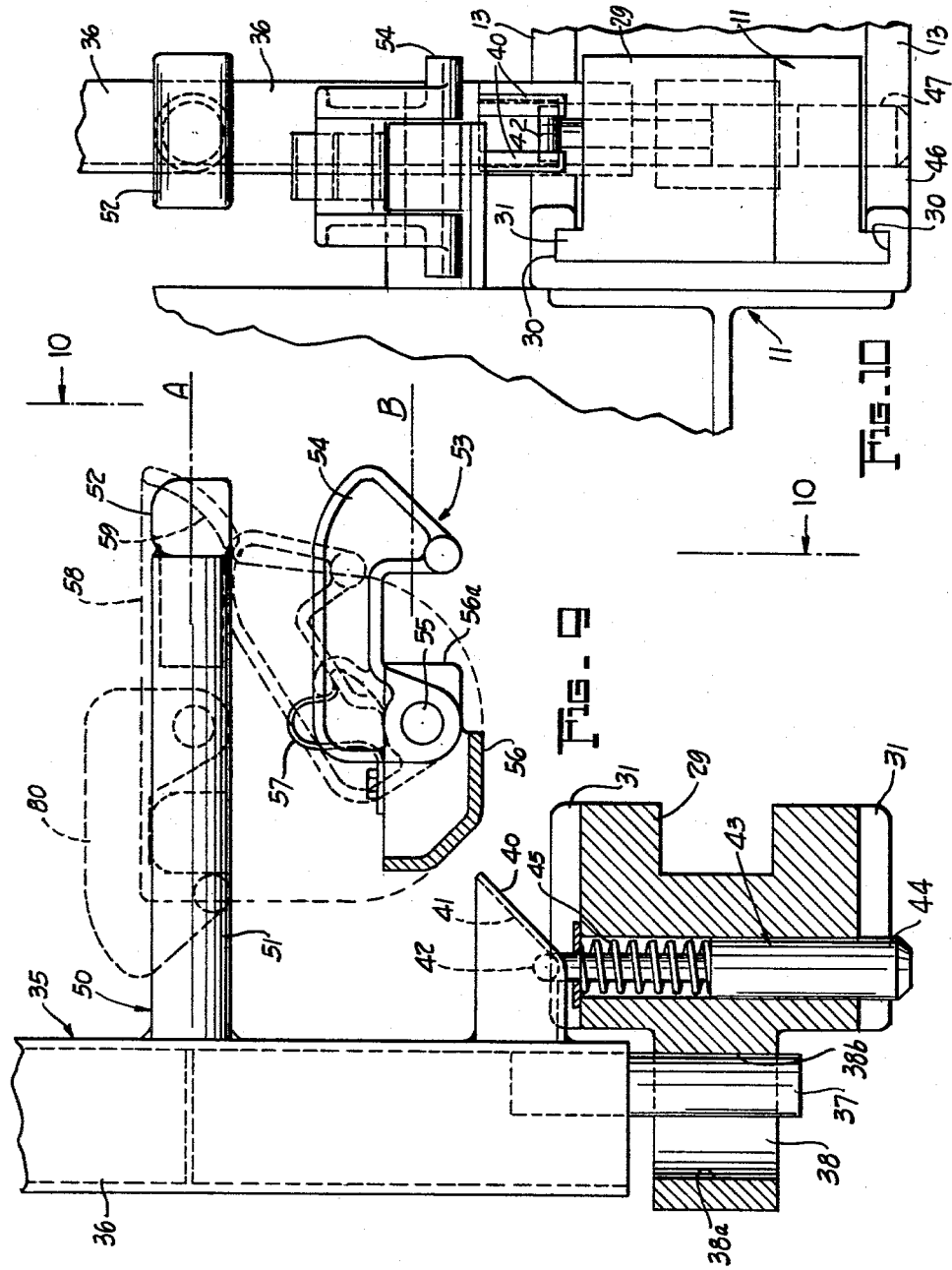
INVENTOR.
W. A. BERTOLINI
BY
Robb+Robb
attorneys Dec. 29, 1964  W. A. BERTOLINI  3,163,442
BOGIE SPRING EQUALIZING CONSTRUCTION
Original Filed Dec. 5, 1960  5 Sheets-Sheet 4
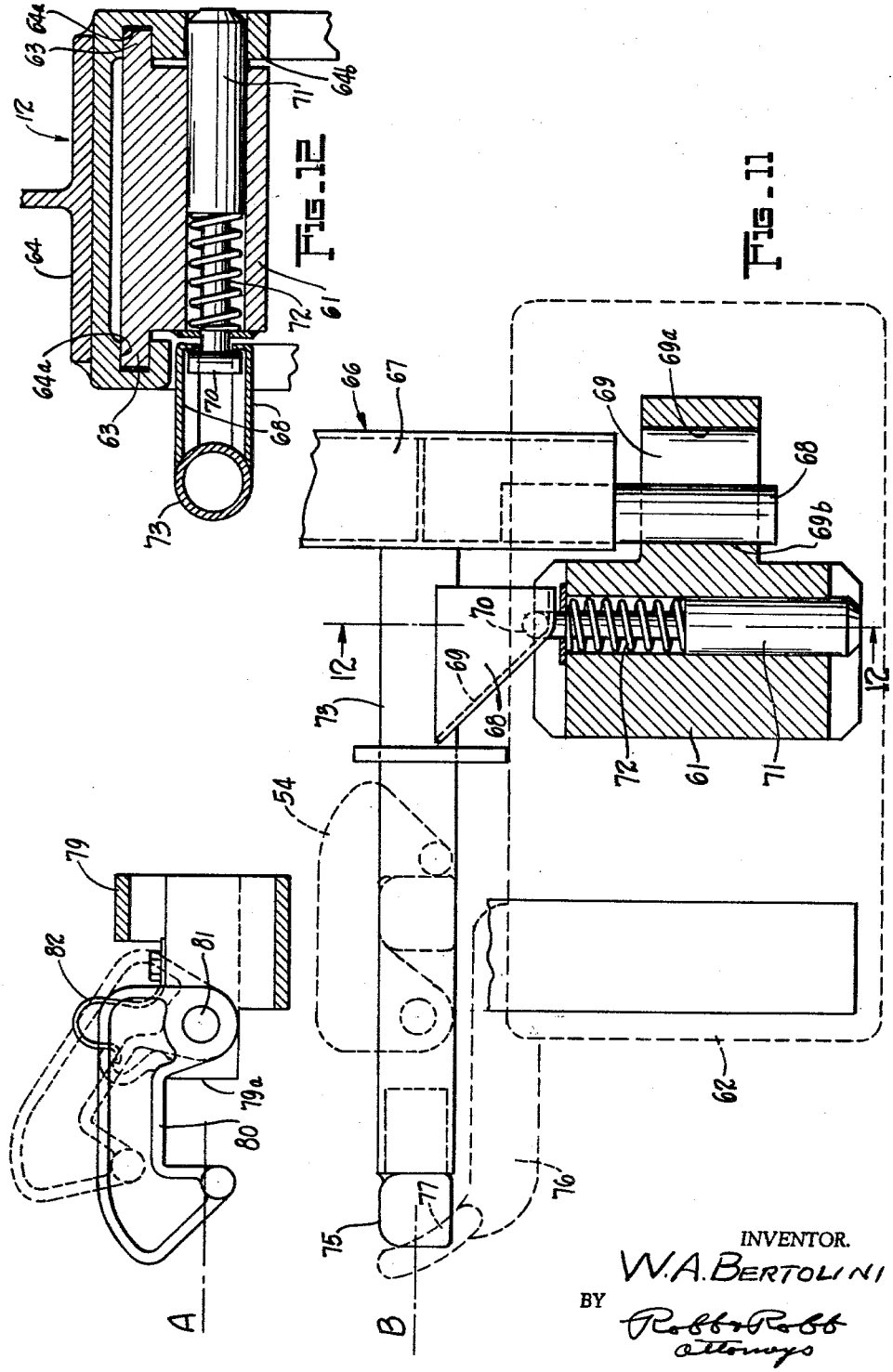
INVENTOR.
W. A. BERTOLINI
BY Robb & Robb
Attorneys Dec. 29, 1964   W. A. BERTOLINI   3,163,442
BOGIE SPRING EQUALIZING CONSTRUCTION
Original Filed Dec. 5, 1960   5 Sheets-Sheet 5
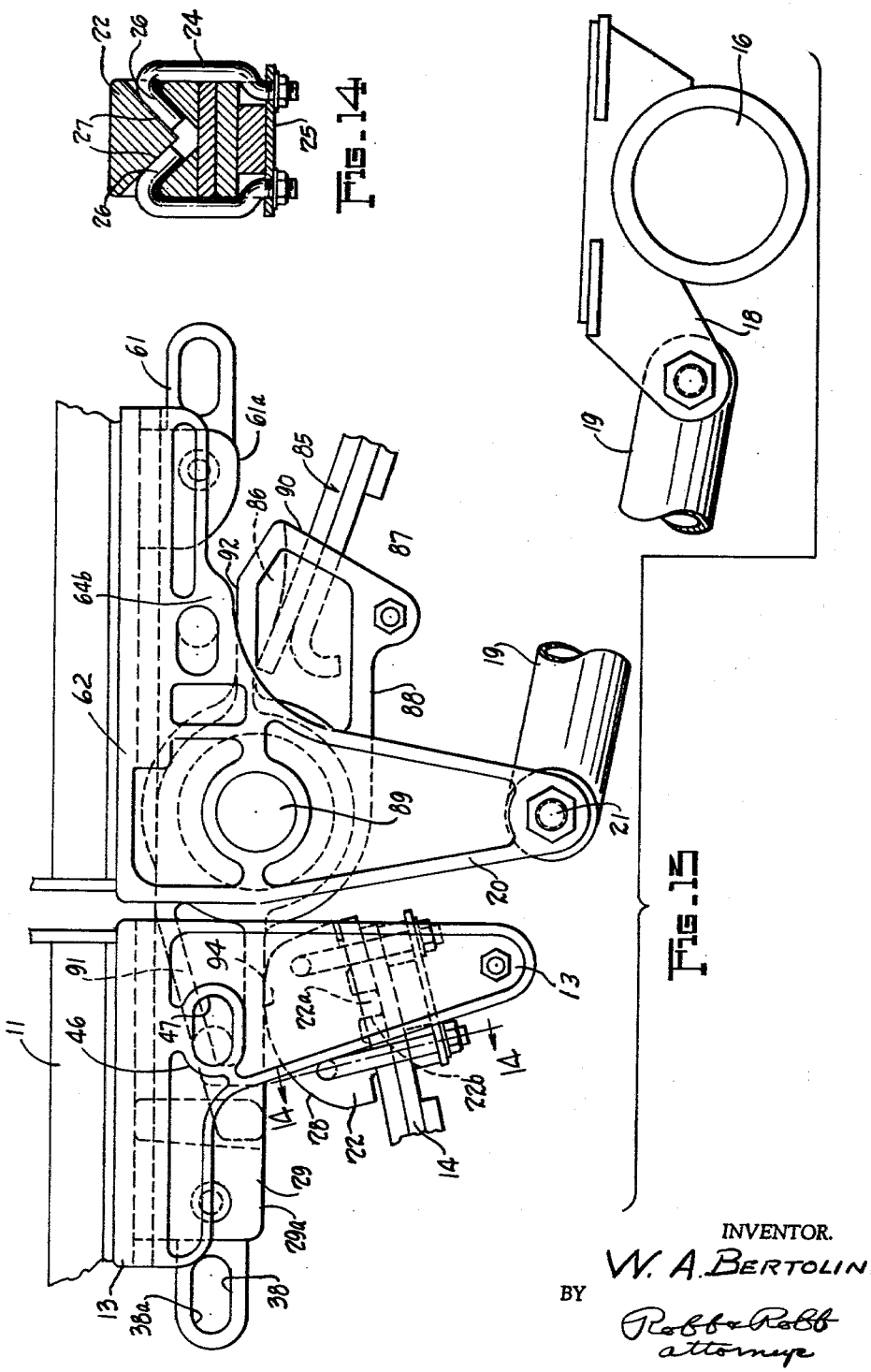
INVENTOR.
W. A. BERTOLINI
BY
Robb & Robb
attorneys

United States Patent Office 3,163,442
Patented Dec. 29, 1964

3,163,442
BOGIE SPRING EQUALIZING CONSTRUCTION
William A. Bertolini, Cincinnati, Ohio, assignor to Highway Trailer Industries, Inc., Edgerton, Wis., a corporation of Delaware
Continuation of application Ser. No. 73,712, Dec. 5, 1960. This application July 19, 1963, Ser. No. 296,163
15 Claims. (Cl. 280—104.5)

This application is a continuation of application Serial Number 73,712, filed December 5, 1960, now abandoned.

This invention relates to vehicle construction and particularly to the construction of the chassis and running gear portions thereof.

More particularly, the invention is directed to vehicles in which tandem or a plurality of axles are provided, and which axles and associated parts are arranged to provide the equalizing effect desirable for improved riding qualities and to increase the life of the entire vehicle and its associated parts.

The invention further provides improvement in the body construction, possible to be used, as for example in the container type of body and the transport thereof.

Where a vehicle body is constructed as a container which as a matter of fact may preferably be in the form of a pair or plurality of containers which are desirably transported separately, or together as a unit, even greater advantage is attained by availing of the concept hereof.

More specifically, this invention provides for the construction and operation of truck trailers, which are comprised of individual containers, a chassis formed of identical main frame members, one for each container, running gear, separably connected to the containers to constitute separate trailers, and jointly operable as a tandem unit or a unit having a plurality of axles when properly positioned and including automatically established equalizing action of said unit.

With the foregoing general statement in mind, it is a principal object of this invention to provide a novel trailer construction, in which the trailer is comprised of a pair or plurality of containers, identical in construction, which containers are mounted upon suitable chassis and removable therefrom, the chassis in turn being provided with movable bogies or axle units, whereby a pair or plurality of identical trailers may be arranged from the parts previously described, by manipulation of the respective containers and the running gear thereof.

A further object of this invention, is to provide a novel arrangement of the running gear, whereby an equalizing effect is provided when the axle units of a pair or plurality are brought into juxtaposition, equalizing effect being automatically established by instrumentalities provided which are actuated upon movement of such running gear into the position previously mentioned.

Yet another object of this invention is to provide novel construction which makes possible the use of identical bogie or axle units, which axle units may be assembled with or connected to and slidable with respect to frames of containers, which frames are a part of or removable from the containers as may be desired, the containers being connectible together so that a single trailer is provided and the bogies or axle units being positioned with regard to such now constructed or arranged single unit so that they operate as a tandem or multi-axle in the usual manner with equalizing effect provided.

Still another object of the invention is to provide novel running gear construction, in which a sub-frame is provided for each axle unit, said sub-frame being slidable with regard to a main frame and the main frame in turn connectable to a container if desirable, there being provided thus a small trailer with a single axle thereon, and when a pair or plurality of these units are brought into adjacent condition, connecting of the containers is effected, the axle units are combined in a manner to provide a tandem or multi-axle unit, and equalizing such units is provided by the operation of automatic instrumentalities operable upon movement of the respective units with regard to one another.

A more particular object of the invention is to provide a novel arrangement of the axle or bogie units, which involves the provision of suitable equalizing instrumentalities, which are operable when a pair or plurality of axle units are in adjoining condition, and said equalizing instrumentalities are rendered inoperable upon separation of said axle units so to speak.

Another more particular object of the invention is to provide a novel arrangement of springs and the connections thereof with a bogie or axle units, whereby said spring units in conjunction with the sub-frame with which the same may be associated, will operate as a single axle unit under certain conditions, and upon assembly of a pair or plurality of such units, operate certain means to render the inter action of the springs of adjoining units suitable for equalizing transfer of loads, said action taking place automatically upon assembly as indicated.

Another more specific object of the invention is to provide axle or bogie units, which are identical, and yet which have definite fore and aft parts, whereby assembly of the respective units in the particular relationship, will actuate equalizing instrumentalities to bring the same into operation upon conjunction of the sub-frame with which the same is identified, the instrumentalities being automatically rendered inoperable when the frames with which the instrumentalities are associated, are separated.

Other and further objects of the invention will be more clearly understood from a consideration of the specification appended hereto and illustrated in the drawings wherein:

FIGURE 1 is a diagrammatic view, in elevation, indicating the position of any two trailer units prior to the assembly into a single unit.

FIGURE 2 is a view similar to FIGURE 1, likewise diagrammatic, illustrating the trailer units assembled as a single unit with the wheel and axle units moved into tandem relationship.

FIGURE 3 is a fragmentary view, in plan and in section, illustrating the position of respective sub-frames and elements associated therewith, in the position for connection.

FIGURE 4 is a view in elevation of the disclosure of FIGURE 3 illustrating the relationship of the parts.

FIGURE 9 is a fragmentary view, on a substantially enlarged scale, of certain of the actuating mechanism which is relied upon to actuate the various parts to connect the respective wheel and axle units.

FIGURE 10 is a fragmentary and elevational view taken about on the line 10—10 of FIGURE 9 looking in the direction of the arrows.

FIGURE 11 is a view similar to FIGURE 10 of the adjacent instrumentalities provided for connection and operation of the equalizing phases of the invention.

FIGURE 12 is a fragmentary sectional view taken about on the line 12—12 of FIGURE 11 looking in the direction of the arrows.

FIGURE 13 is a substantially enlarged view showing the equalizing unit in condition for operation where the bogies with which the respective parts are associated, have been brought into juxtaposition.

FIGURE 14 is an enlarged fragmentary sectional view taken about on the line 14—14 of FIGURE 13 looking in the direction of the arrows, to illustrate the connection of the pillow block with the spring end.

Figure 5:
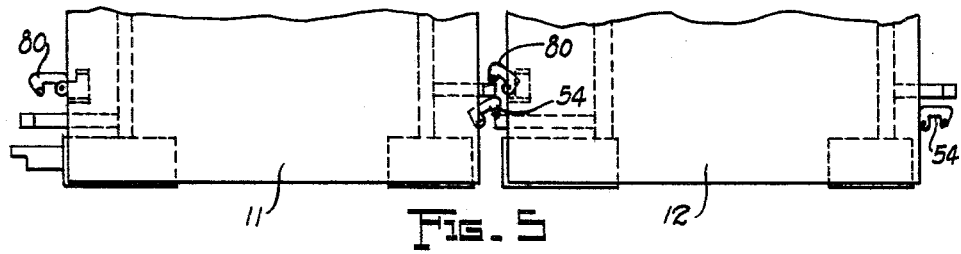
FIGURE 5 is a view similar to FIGURE 3, with the respective parts moved somewhat closer together.
Figure 6:
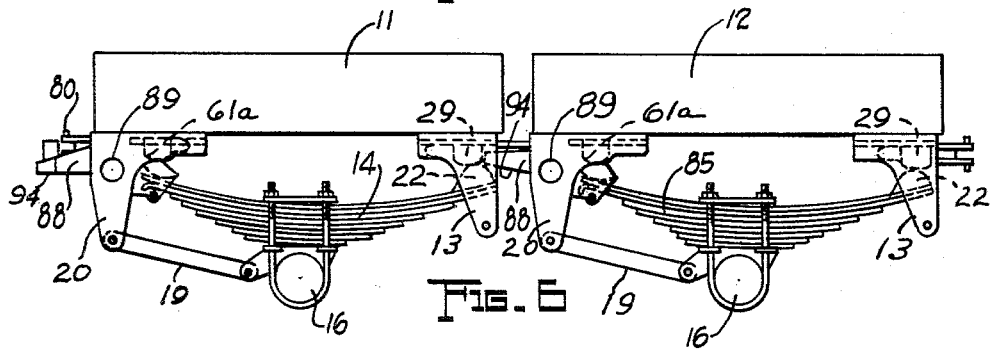
FIGURE 6 is a view similar to FIGURE 4 with the corresponding parts moved into the position of FIGURE 5 likewise closer together.

Turning now to a consideration of the drawings and particularly certain of the diagrammatic aspects, to outline the broad basis for the detail description to follow, FIGURE 1 discloses containers denoted 1 and 2 supported on chassis 3 and 4 respectively, these chassis including main frame units 5 and 6, with wheel and axle units 7 and 8 respectively connected thereto in position which would be normally provided where these containers are to be transported as trailers.

Each of the container chassis 3 and 4 is provided with suitable landing gear 9 and 10 respectively, of the folding type and adapted to fold upwardly into the chassis or main frame 5 and 6 and provide an unobstructed lower surface.

The wheel and axle units 7 and 8 include sub-frames 11 and 12 respectively, which sub-frames and the wheel and axle units with which they are associated, are susceptible of sliding along beneath the containers 1 and 2 on the main frames 5 and 6 respectively, in either direction.

Turning now to a consideration of FIGURE 2, containers 1 and 2 are shown in connected relationship, to thereby provide a single body unit, with the chassis likewise providing a single chassis in effect, but in this instance the forward wheel and axle unit 7, has been moved rearwardly along beneath the main frame 5, and the main frame 6 of the container 2, to a position where the same occupies a tandem relationship with the wheel and axle unit 8. It is of course necessary to lock these units with regard to one another, and desirable to provide equalizing interchange of the load from one axle unit to the other in the course of movement of the trailer as such over the the highway or other place.

It will be of course understood that each of the chassis 3 and 4 is provided with a suitable king pin arrangement, for connection to a suitable tractor whereby each of the units may be drawn as a trailer or the same may be moved together as is illustrated in FIGURE 2.

The detailed invention herein under consideration, and constituting the primary improvement hereof, relates to the construction and operation of the respective wheel and axle units 7 and 8, the same being sometimes denoted as bogies and including the sub-frames 11 and 12.

While the invention is illustrated and described as embodying a pair of containers and a pair of axle units, it is of course noted that a plurality of such instrumentalities is contemplated as being susceptible of use where circircumstances demand, in a manner which will be even more apparent as this description proceeds.

It is necessary to advert now to the drawings of FIGURES 9 through 14 inclusive, to illustrate the construction in enlarged detail as same has bearing upon the operation illustrated in the FIGURES 1 to 8 inclusive.

Referring therefore to FIGURE 13, the sub-frame 11 of the forward unit, in position corresponding to that illustrated in FIGURE 2, is shown as having connected there beneath, a plain hanger generally denoted 13, it being understood that this hanger is provided as one of a pair, the one on the opposite side of the sub-frame 11 being identical thereto and providing support for the rear end of a spring designated 14, this being comprised of the usual leaf construction, more particularly indicated in FIGURE 4 for example as comprising a series of leaves connected by the usual U-bolt 15 to an axle 16, the axle 16 obviously being that upon the ends of which the wheels are mounted. The axle 16 is cradled in an axle saddle 17, at the forward end of which is the usual radius rod connection 18, radius rod 19 extending forwardly therefrom and connected to the equalizing or front spring hanger generally denoted 20 at 21.

Reverting now to FIGURE 13 again, the spring 14 is shown as being equipped with a pillow block 22, of construction such as is illustrated in FIGURE 14 fastened to the spring by the hook bolts 24 and plate 25 extending therebetween, the hook bolts having ends 26 extending into mating openings 27 of the corresponding pillow block 22. The pillow block 22 is provided with an integral boss 22a, extending below the same, into an opening 22b formed in the rear end of the upper spring leaf of the spring 14. The pillow block 22 is provided with an arcuate upper surface 28 as illustrated in FIGURE 13 so that the spring 14 at the end to which the block 22 is connected, this being the rear end of the spring, will be permitted to flex with regard to a bearing block 29 (see FIGURE 4), designated the rear sliding bearing block the illustration of FIGURE 9 showing this bearing block 29 in sectional detail in plan.

Referring to FIGURE 10, the bearing block 29 is slidable with respect to the sub-frame 11, by reason of the provision of channel-like grooves 30, which engage with outwardly extending slide portions 31, at opposite sides of the upper surface of said bearing block 29. The hanger 13 is connected to the sub-frame 11 directly, being fastened thereto in any suitable or preferred manner.

It is recalled that a bearing block 29 will be provided for the opposite side of the wheel and axle unit 7 now being discussed and will be operated in a manner to be subsequently set forth.

In order to effect movement of the sliding bearing block 29, a suitable push frame generally denoted 35 is provided, this consisting of a transverse channel or cross bar 36, at one end of which is fixed a lost motion connection including an offstanding pin 37, suitably fixed at one end of the channel or cross bar 36, the other end, not shown in FIGURE 9 being similarly equipped. The pin 37 extends into an elongated opening 38, as indicated in FIGURE 9 and also in FIGURE 13, and adjacent the end where the pin 37 is fastened, there likewise extends in a rearward direction from the channel or cross bar 36, a cam operating member 40. The cam operating member 40 includes the cam surface 41 thereon angularly related to the channel or cross bar 36, and as indicated in greater detail in FIGURE 10, a pair of said cam members 40 is provided, to engage upper and lower ends of a pin 42 engaged with a latch unit generally denoted 43, the latch unit 43 including a lock pin 44 engaged with the pin 42 and a spring 45 which tends to maintain the lock pin 44 in extended position so as to engage with a side rail portion 46 of plain hanger 13 previously referred to. The rail 46 is equipped with an elongated opening 47 therein suitably located so that the pin 44 will fix the sliding bearing block 29 in position with relation to the sub-frame 11 for example, to which the rail 46 is connected. It is again pointed out that a similar cam and pin arrangement is provided in the corresponding bearing block 29 at the opposite side of the channel or cross bar 36.

When the channel or cross bar 36 is moved to the left for example in FIGURE 9, by reason of the lost motion connection provided by the pin 37 and opening 38, such movement will occur prior to moving the sliding bearing block 29, and in doing so will cause the pin 42 to ride up the cam surfaces 41 and withdraw the pin 44 from its position in the rail 46. Thereafter when the pin 37 engages the end 38a of the opening 38, the bearing block 29 will be moved with the frame in a manner to be subsequently explained.

Extending rearwardly from the channel or cross bar 36, as indicated in FIGURE 9, is a connector rod unit 50 including the rearwardy extending part 51 and the T-head or connector head 52 at the end thereof, said head 52 being adapted to engage certain instrumentalities on the adjacent bogie or axle unit 8 as will be set forth shortly.

In the same general area, a suitable draft means generally denoted 53 is provided, including a pawl 54 which is pivotally mounted at 55 on a push rod bracket 56 suitably fastened to the sub-frame 11, a spring of special construction denoted 57 being provided to maintain the pawl in the full line position as indicated in FIGURE 9, but permitting the same to move as will be set forth hereinafter into the dotted line position shown in said figure about the pivot 55.

The just before described connector rod unit 50 and draft means, are similarly provided at the opposite side of the sub-frame 11, and in corresponding relationship but of the opposite hand.

There is provided at the same general area, a suitable cam and guide bracket 58, fastened beneath the sub-frame 11, and including the cam member 59 arranged about as indicated in FIGURE 9 for purposes that will be subsequently set forth. The corresponding cam and guide bracket arrangement is provided at the opposite side of the sub-frame 11 to that shown in FIGURE 9 as will be understood.

Referring now to FIGURES 11 and 12, it is noted that FIGURE 11 is arranged with respect to FIGURE 9 with the dotted center lines A and B in alignment, as bases for reference in subsequent operation to be set forth.

Describing the construction of the mechanism which will be denoted the front mechanism on the wheel and axle unit 8, it will be seen that the disclosure of FIGURE 11 is substantially similar to that of FIGURE 9, but oppositely arranged and including an equalizer sliding bearing block 61, shown as mounted in the equalizer bracket shown in dotted lines in FIGURE 11 at 62, the latter more generally described as the front equalizing or spring hanger 20.

The equalizer sliding bearing block 61, is mounted in a manner similar to the bearing block 29, including the oppositely extending slide portions 63 formed on said bearing block. Grooves 64a are formed in the upper portion 62 of the hanger 20, to receive the parts 63 for sliding engagement therewith, the hanger 20 being shown as extending downwardly from the sub-frame 12. This will facilitate movement of the sliding bearing blocks 61 and 29 with respect to their respective sub-frames 12 and 11.

A front push frame generally denoted 66 is shown in FIGURE 11, as including the transversely extending cross bar 67 which is similar to the cross bar 36 previously mentioned, and includes the outwardly extending pin 68 in the opening 69 formed in the sliding bearing block 61, the opening 69 having the rear stop surface 69a provided therein.

The push frame 66 is equipped with suitable cam parts 68 formed like the cam parts 40 with the inclined cam surfaces 69 adapted to engage a pin 70 extending through a lock pin 71 at the end thereof. A spring 72 is provided to maintain the pin 71 in its outwardly extended position, the position shown in FIGURE 12 being with the pin in engagement with a side rail portion 64b of the spring hanger 20.

A connector rod unit 73 provides the means for fastening the cam members 68 to the transversely extending channel or cross bar 67, and extends forwardly terminating in a T-head 75.

A push rod bracket 76, shown in dotted lines in FIGURE 11 is provided and includes the cam member 77 arranged about as indicated for purposes which will be explained when the operation of the mechanism being described is set forth.

A suitable draft means on the mechanism now being discussed in FIGURES 11 and 12, is likewise furnished, including a bracket 79 on which is mounted the pawl 80 pivotally arranged on the pivot 81 and including the spring 82 to maintain the pawl in the full line position of said figure and permitting the same to move into the dotted line position therein as necessary.

The foregoing described mechanism shown in FIGURES 11 and 12, is provided at the opposite side of the channel or cross bar 67, in the push rod unit 66 here under consideration, being of the opposite hand as will be apparent and operable in unison with the disclosures of FIGURES 11 and 12 in a manner now to be set forth.

Assuming that the disclosures of FIGURES 9 and 11 and the parts on the opposite ends of the corresponding cross bars of the push rod units 35 and 66, are arranged with the dotted lines A and B of each drawing in alignment, then the wheel and axle units 7 and 8 are moved through the positions in sequence from FIGURES 3 to 8 inclusive, first by locking the brakes of the unit 7, and releasing those of unit 8. Thereafter the entire vehicle is moved to the left until the units are in juxtaposition as in FIGURE 2. During such action, the connector rod units 50 and 73 will move toward each other, the heads 52 and 75 of the respective units becoming engaged with the pawls 54 and 80 respectively. When the heads 52 and 75 engage with the ends of the pawls, the same move into the dotted line positions of the respective figures. Thereafter the pawls upon further movement, engage over the heads 52 and 75 respectively, assuming the full line positions of said figures. The heads will abut with the respective brackets 56 and 79 on the surfaces 56a and 79a. Further movement of these parts toward one another, will actuate the push rod frames 35 and 66 in a manner to cause the transverse channel or cross bars 36 and 67 respectively, to move so that the pins 37 and 68 will abut with the surfaces 38a and 69a respectively. During this movement the cam surfaces 41 and 69, will cause a withdrawal of the pins 44 and 71 respectively, releasing the sliding bearing blocks associated therewith similarly from fixed position with regard to the sub-frame with which each is associated. This will permit the sliding bearing blocks 29 and 61 to be moved thereafter for a limited distance, or until the same have become disengaged from the corresponding spring ends of springs with which the same are normally associated in the inoperative position so to speak of the equalizer unit.

Reference should be had to FIGURE 13 to point out that the spring of the rear unit is denoted 85, generally being a leaf spring identical to the spring 14, normally adapted to engage with a pad section 86 formed in the equalizer member 87 to be described in greater detail shortly.

The equalizer member 87, includes a main body 88 pivotally mounted on the pivot 89, with a rear spring end receiving section 90 and a forward spring end engaging section 91. The section 90 includes an upper surface 92 adapted to engage the lower surface 61a of the bearing block 61 when the respective parts are in the positions indicated in FIGURE 4 for example prior to actuation of the push frames 35 and 66 as has been generally described previously.

The plain bearing block 29, normally engages at its lower surface 29a with the upper surface 28 of the pillow block 22 fastened on the rear end of the spring 14 of the bogie or axle unit 11.

Since the surface 92 of the equalizer member 88 engages the bearing block surface 61a when the equalizer is inoperative, it will be seen that the weight transferred to the spring 85 is transferred from the container through the sub-frame 12 to the spring end of the wheel and axle unit 8.

When the push frames 35 and 66 are actuated as has previously been described, through the positions indicated in FIGURES 3 to 8 inclusive, the condition of the respective brackets 20, comprising the hanger for the equalizer 88, and the plain bracket 13, which normally guides and positions the rear end of the spring 14, is that shown in FIGURE 13. The equalizer member 88 assumes the position shown in said figure whereby the portion 94 of said equalizer 88, is now in position engaging the pillow block surface 28, the sliding bearing block 29 having been displaced in the manner previously set forth by movement of the push frame 35.

Similarly the push frame 66 has caused the rear or equalizer bearing block 61 to move rearwardly to the position shown in FIGURE 13, whereby the surface 61a thereof is moved out of engagement with the surface 92 of the equalizer member 88.

In view of the foregoing arrangement of the parts, the equalizer member 88 may pivot on the pivot 89, in response to movement of the respective ends of the springs 14 and 85 and effectively operate in an equalizing manner to transfer the weight in response to movement of the tires, wheels and axles with which each spring is associated.

It is noted that the hangers 13 and 20 are provided at opposite sides and at the ends of the respective wheel and axle units to provide the arrangement of the respective views and facilitate the equalizing movement where necessary.

Figure 7:
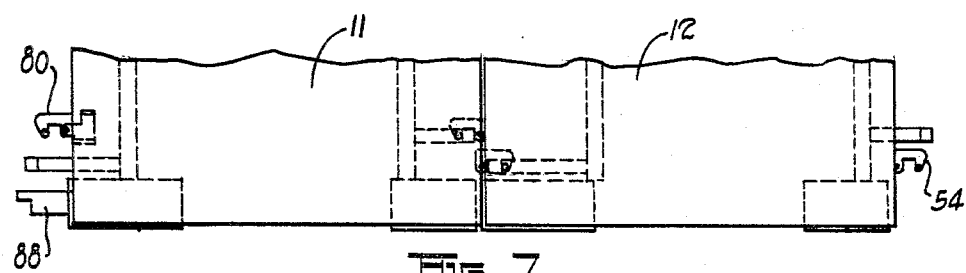
FIGURE 7 is a view similar to FIGURES 3 and 5, wherein the wheel and axle units or bogie units have been brought into juxtaposition, and the same assume a position corresponding to the wheel and axle units of FIGURE 2.
Figure 8:
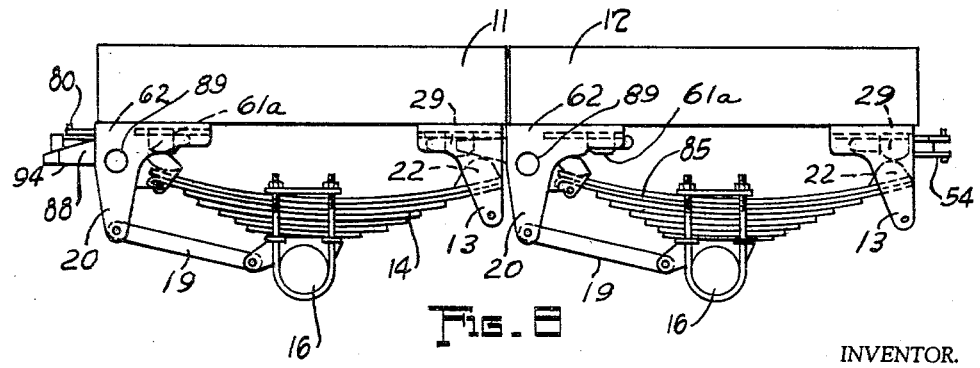
FIGURE 8 is a view in elevation, somewhat fragmentary likewise of enlarged disclosure along the lines of the wheel and axle relationship established in FIGURE 2.

When the parts have assumed the position of FIGURE 13, the condition of FIGURES 2, 7 and 8 will exist, with the pawls 54 and 80 in their full line positions, in latched relationship with the heads 75 and 52 respectively. The sub-frames 11 and 12 are in close association, acting as a single frame with the pawls assuming the longitudinally transposed dotted line positions of the respective drawings.

When it is necessary to separate the wheel and axle units 7 and 8 to move into condition to support separate containers 1 and 2, the brakes of the wheel and axle unit 7 may be set, those of the unit 8 being in released condition. As the trailer is thereafter backed, the unit 7 will slide forwardly. During this sliding movement, it will be understood that the wheel and axle units, are of course moving in opposite directions so to speak, and necessarily the pawls of each of the draft means are engaging with the respective heads 52 and 75. This engagement, continued, will cause the pins 37 and 68 to move toward and eventually into the full line positions of the respective FIGURES 9 and 11 whereby the said pins abut the surfaces 38b and 69b. At this particular time the lock pins 43 and 71, are released so that if the ends could extend into openings in the guide rails 46 and 64a respectively, the sliding bearing block with which each is associated would correspondingly be locked. However the end of the pin will abut with the inside of the respective guide rail and until such time as enough movement has been effected in the respective bearing block so that the pin is opposite an opening as indicated for example in FIGURE 12 as well as FIGURE 10, whereby the pin will be positioned automatically by the respective spring associated therewith. This has necessarily taken place as a result of the movement of the bearing blocks 29 and 61 back to what may be termed their original condition as described herein.

When the sliding bearing blocks have returned to their original condition, they will of course have assumed positions opposite the respective spring ends of the springs 14 and 85, the spring end of the latter having the weight transferred through the portion 86, the surface 92 and the surface 61a. Correspondingly the sliding bearing block 29 will be positioned so that the pillow block 22 is in engagement therewith and the equalizer 88 is thereby rendered inoperative to carry out any equalizing action, such action being unnecessary in view of the separated condition of the respective wheel and axle units.

It is desirable to point out that when the pawls 54 and 80 have caused the push rod frames of the opposite members, namely the frames 66 and 35 respectively to move into the full line positions of the FIGURES 9 and 11, the pawls are caused to disengage from the heads by the provision of the cam surfaces 59 and 77 pivoting the pawls into the pivoted positions illustrated by the dotted lines. Thereafter further movement in the separating direction so to speak, will permit the pawls and heads to become disengaged.

The sub-frames are locked to the respective main frames by suitable means, not illustrated here, such lock means being arranged to facilitate the positioning of the respective containers as shown for example in FIGURE 1 or with the positions of the units reversed.

I claim:

1. In trailer construction of the class described, in combination, a body, a first axle unit movably mounted beneath the body, a second axle unit similarly mounted, equalizing means carried by at least one of said units, spring means for each of said units, said equalizing means extending between adjacent ends of the spring means on each unit and having portions cooperable with said spring means to distribute the load therebetween, said equalizing means being operable when the axle units are in juxtaposition, and means rendering the equalizing means operative in response to relative movement between the axle units, said means rendering the equalizing means operative including block means carried by each of said axle units selectively engageable with the ends of each of the spring means to defeat equalization when the units are separated, and push frame means carried by the axle units to move the block means to effect equalization when the units are moved into juxtaposition.

2. The combination as claimed in claim 1, wherein the means to move the block means includes latch instrumentalities.

3. In trailer construction of the class described, in combination, a body, a first axle unit slidably mounted beneath the body, a second axle unit similarly mounted, each of said axle units releasably positioned with respect to the body, equalizing means carried by at least one of said units, spring means on each unit cooperable with the equalizing means to distribute the load between the first and second axle units when the units are in juxtaposition, and push frame units on each of said axle units actuated by each other upon movement of the axle units into juxtaposition to effect equalizing operation of said equalizing means and defeat equalization when said axle units are separated from each other.

4. The combination as claimed in claim 3, wherein the push frame unit on one axle unit includes elements acting on the push frame unit on the other axle unit, each push frame unit including block means engaging the spring means, a push bar connected to the block means, operating parts likewise connected to the bar, and latch instrumentalities actuated by the parts aforesaid to release the push bar and facilitate movement of the block means and operating positioning of the equalizing means.

5. In vehicle construction of the class described, in combination, frame instrumentalities, a first axle unit engaged therewith, a second axle unit for said instrumentalities, each said unit including spring means therein, each spring means being engaged with an equalizer unit having supporting means, another portion of each spring means engaging a plain bearing block, and means to move the supporting means and bearing blocks when the axle units are moved into juxtaposition, whereby the equalizer units are rendered operative, said equalizer units being rendered inoperative when said axle units are separated, the axle units being slidably engaged with the frame instrumentalities, each axle unit includes a sub-frame, each sub-frame is equipped with plain bearing blocks for engagement by the rear portions of the spring means, equalizer bearing blocks are provided for coaction with the forward portions of the adjacent spring means, and the plain and equalizer bearing blocks are moved out of coacting position with adjacent portions of the spring means of adjacent axle units when the axle units are moved into juxtaposition.

6. In vehicle construction of the class described, in combination, frame instrumentalities, a first axle unit engaged therewith, a second axle unit for said instrumentalities, each said unit including spring means therein, each spring means being engaged with an equalizer unit having supporting means, another portion of each spring means engaging a plain bearing block, and means to move the supporting means and bearing blocks when the axle units are moved into juxtaposition, whereby the equalizer units are rendered operative, said equalizer units being rendered inoperative when said axle units are separated, the spring means comprising longitudinal spring members, the forward end of each engaging a supporting means comprising a bearing block in a corresponding equalizer unit, the rear ends of the spring members comprising said other portion engaging the plain bearing blocks mentioned, and the means to move the bearing blocks and plain bearing blocks consists of a push frame to which said bearing blocks are connected.

7. The combination as claimed in claim 6, wherein draft means are provided to releasably connect the push frame of one unit with a corresponding push frame of the adjacent unit.

8. The combination as claimed in claim 6, wherein each axle unit includes a push frame, draft means are provided for each, lost motion elements are provided in each frame and latch means are mounted therein to releasably fix the bearing blocks to their corresponding sub-frames.

9. In vehicle construction of the class described, in combination, a pair of frame members, an axle unit for each member, said units comprising a sub-frame, a pair of springs in the axle unit for each sub-frame, said springs extending longitudinally, equalizer units for each axle unit, the forward end of each spring engaging an equalizer unit, the rear end of each spring engaging a plain hanger unit, each equalizer unit includes a sliding bearing block movable into and out of position to render said equalizer unit operative and inoperative, each plain hanger unit includes a plain bearing block slidable into and out of position in engagement with its corresponding spring end, and means to move the equalizer and plain bearing blocks of adjacent spring ends in response to movement of the respective axle units into juxtaposition.

10. The combination as claimed in claim 9, wherein the draft means to move the bearing blocks include push frames and draft means, and latch means are provided to fix the position of the bearing blocks with respect to the sub-frame members.

11. The combination as claimed in claim 10, wherein the means to move the bearing blocks also include portions of the equalizer units.

12. The combination as claimed in claim 10, wherein the push frames are connected to the latch means for operating the latter.

13. The combination as claimed in claim 11, wherein the equalizer units include equalizer members, each of said members having a portion to assume the position of the plain bearing block of the adjacent hanger unit when the latter is moved out of spring end engaging position, said portion thereafter cooperating with said spring end for equalizing action.

14. In vehicle construction of the class described, in combination, frame instrumentalities including a frame member, a first axle unit engaged therewith, said unit including spring means therein, a second axle unit engaged with said instrumentalities, said units being slidable along the frame member, spring means in said second unit, each said spring means being arranged to provide resilient support for said instrumentalities, and equalizer means intermediate said spring means and frame instrumentalities, said equalizer means being rendered operative only when the units are moved into predetermined relationship in juxtaposition, and rendered inoperative when moved out of said relationship, the spring means in the first axle unit engage an equalizer unit at one end of said unit and a plain bearing block at the other end of said unit, and the equalizer unit includes an equalizer bearing block movable out of position engaging the equalizer means, whereby said means is rendered operative on engagement with the spring end at the plain bearing block in the other unit.

15. In vehicle construction of the class described, in combination, frame instrumentalities including a frame member, a first axle unit engaged therewith, said unit including spring means therein, a second axle unit engaged with said instrumentalities, said units being slidable along the frame member, spring means in said second unit, each said spring means being arranged to provide resilient support for said instrumentalities, and equalizer means intermediate said spring means and frame instrumentalities, said equalizer means being rendered operative only when the units are moved into predetermined relationship in juxtaposition, and rendered inoperative when moved out of said relationship, the spring means in the first axle unit engage an equalizer unit at one end of said unit and a plain bearing block at the other end of said unit, and the equalizer unit includes an equalizer bearing block movable out of position engaging the equalizer means, whereby said means is rendered operative on engagement with the spring end at the plain bearing block in the other unit, and said equalizer unit is rendered inoperative when the same is moved out of engagement with said spring end.

References Cited in the file of this patent
UNITED STATES PATENTS

| 2,665,142 | Talbert | Jan. 5, 1954 |
| 2,962,295 | Tenenbaum | Nov. 29, 1960 |
| 3,004,772 | Bohlen | Oct. 17, 1961 |